Aug. 22, 1950 P. F. SHARP 2,519,606
CASEIN MANUFACTURING PROCESS
Filed Feb. 11, 1949 2 Sheets-Sheet 1
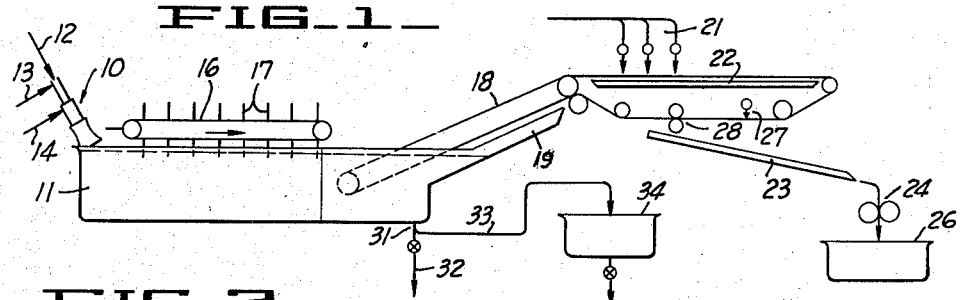
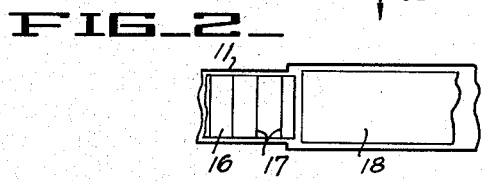
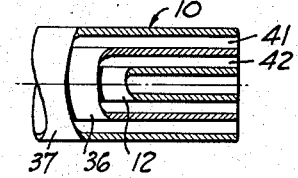
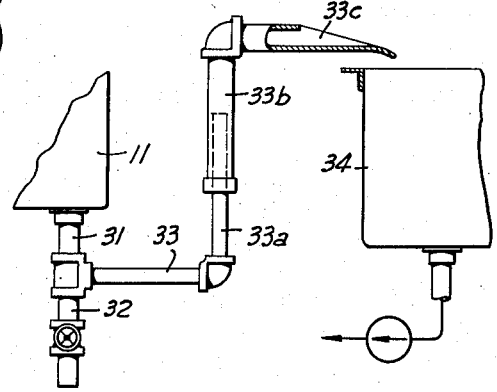
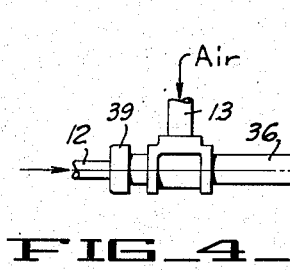
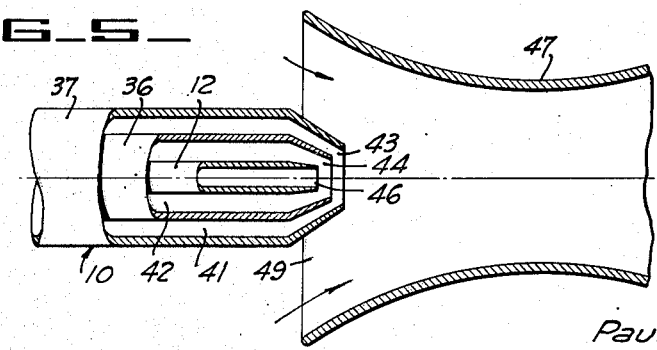
INVENTOR.
Paul F. Sharp
BY
ATTORNEYS

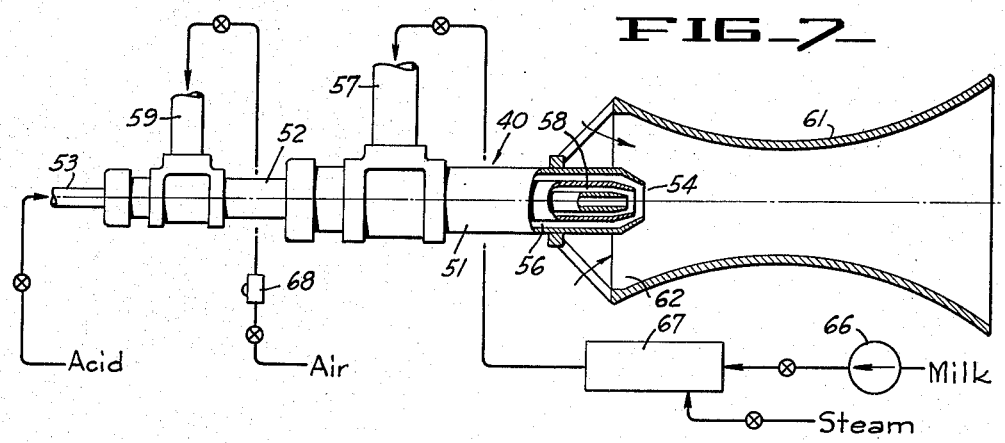
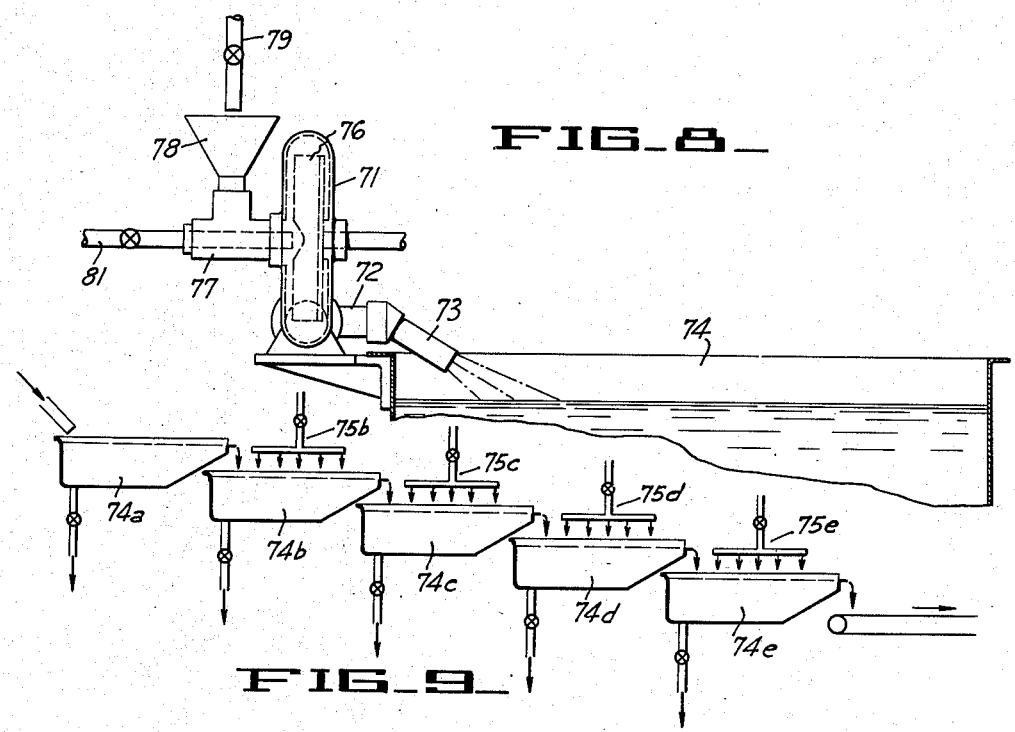

Patented Aug. 22, 1950

2,519,606

UNITED STATES PATENT OFFICE 2,519,606

CASEIN MANUFACTURING PROCESS

Paul F. Sharp, Piedmont, Calif., assignor to Golden State Company, Ltd., San Francisco, Calif., a corporation of Delaware Application February 11, 1949, Serial No. 75,763

5 Claims. (Cl. 260—120)

This invention relates generally to processes for the manufacture of casein or like coagulable material.

In conventional processes for the manufacture of casein, a milk containing casein in coagulable form is subjected to treatment whereby casein is precipitated, after which the coagulated casein curd is removed and purified by washing. Dairy milk from which the fat content has been removed is the most common source of raw material, although less frequently somewhat similar protein products have been made from synthetic milk or like aqueous fluid material prepared from soybean flour, peanut meal or cottonseed meal. Acids such as hydrochloric or sulphuric are generally used as coagulants for addition to the milk to secure the desired precipitation.

As an example of typical conventional practice, milk from which fat has been removed is placed in a treatment vessel, such as a cheese vat. Hydrochloric or sulphuric acid is added while the milk is being stirred, until maximum precipitation of the casein is obtained. The whey obtained in this manner generally has a hydrogen ion concentration within the range of pH 4.4 to 4.8. After the precipitated casein curd has settled the whey is decanted from the vat and the casein removed, after which it can be purified by washing with water. The final casein can be dried and ground.

Various modifications of the conventional process described above have been employed. For example in one modification for continuous operation, the acid and milk are introduced continuously into a common stream which is made to flow over baffle plates to insure thorough mixing. Precipitation occurs continuously and the settled precipitate is continuously removed from the whey by suitable means such as an inclined screw conveyer. In this type of process the casein is precipitated in the form of particles of relatively large size, having a relatively rapid settling rate. As a result considerable whey is trapped in the precipitated particles, thus tending to interfere with purification by washing. Also the relatively large sized particles produced by such methods tend to mat under pressure and to dry as a horny mass.

In an effort to facilitate separation of the precipitated casein, it has been proposed to aerate the milk, after which a stream of the aerated material is acidified to coagulate the casein, and this material is then introduced into a flotation vessel where the precipitated curd rises to the surface of the body of whey. This process has objectionable features, particularly in that in comparison with the present process it is not efficient with respect to the casein yield, and secondly it is difficult with this process to produce a relatively pure form of casein by simple washing, because the curd does not adequately withstand washing operations.

It is an object of the present invention to provide a new process for the manufacture of casein, which is characterized by the use of flotation for the removal of coagulated casein in the form of a foam or froth, and which makes possible a relatively high casein yield.

Another object of the invention is to provide a process of the above character in which the casein foam or froth produced has novel characteristics, particularly in that it withstands washing and thereby facilitates production of a relatively pure final product.

Another object of the invention is to provide a process of the above character which can be carried out continuously with a minimum amount of equipment.

Another object of the invention is to provide a process capable of producing a casein product superior with respect to its flavor characteristics, and which in particular is well suited for use in various food products for human consumption.

Another object of the invention is to provide an improved casein product characterized particularly by its relatively high content of calcium and phosphorus, by the hydrogen ion concentration resulting when it is resuspended in water, and by the fact that a suspension of the product in water will coagulate with rennet.

Further objects of the invention will appear from the following description in which the preferred embodiment is set forth in detail in conjunction with the accompanying drawing.

Referring to the drawing:

Figure 1 is a diagrammatic side elevational view showing apparatus suitable for carrying out the present process.

Figure 2 is a plan view of a portion of the apparatus shown in Figure 1.

Figure 3 is an enlarged diagrammatic detail in side elevation, showing the syphon means for removing whey from the main treatment tank.

Figure 4 is a side elevational view showing construction of a suitable nozzle for simultaneously acidulating and aerating the milk.

Figure 5 is an enlarged detail partly in cross section showing the tip end of the nozzle shown generally in Figure 4.

Figure 6 is a view like Figure 5 but showing a modified form of nozzle.

Figure 7 is a diagrammatic view illustrating another embodiment of the nozzle, and which is adapted to heat the milk simultaneously with acidulating and incorporating air into the same.

Figure 8 is a diagrammatic view illustrating another type of apparatus which can be used for carrying out the present process.

Figure 9 is a diagrammatic view illustrating another type of apparatus for carrying out successive washing operations on the casein foam.

The present process involves bringing together and intimately mixing in a mixing zone, a stream of aqueous liquid material containing protein in coagulable form, and a stream of acid or other coagulant for the protein, and simultaneously introducing into the mixing zone a stream of noncondensible gas which is inert to the materials undergoing treatment. The gas is caused to be intermixed with the liquid material in the aforesaid mixing zone to form a foam containing the coagulated protein. Upon discharge of all of the material into a flotation vessel, the coagulated protein floats as a tenacious foam upon the body of liquid, and may be readily removed for further treatment. In order to produce a relatively pure product the foam is subjected to one or more washing operations, after which it may be dried.

I have found that it is important to carry out acidification practically simultaneously with aeration and agitation to disperse the air or other noncondensible gas and to form the desired foam. It has been found that if acid is added to the milk, and then after a short interval of time the acidified milk aerated, some floatable casein froth is formed, but the particles of casein tend to be in relatively large masses and it is difficult to float all of the precipitated material. In addition the foam produced does not readily withstand washing. Therefore it is difficult to manufacture products of high purity, and in any subsequent washing operations considerable casein is lost. If it is attempted to first aerate the milk, and then acidify for coagulation of the caesin, it has been found that the acid is not thoroughly mixed with the aerated milk and therefore some of the casein is over acidified. By acidifying simultaneously with aeration and dispersion of the air or gas in the mass of liquid material, the air is incorporated in the mass of material at the same time that the acid is dispersed and reacts to precipitate the casein. This results in relatively fine particles of precipitated material, separated from each other by air cells, and the casein at least partially forming the walls of the cells. Such a foam is relatively stable and tenacious and is particularly amenable to purification by washing to produce a relatively pure casein product.

One simple procedure for carrying out the present process is to discharge a jet or spray of aerated milk into a vat from which the casein froth or foam can be removed. The nozzle through which the milk is discharged is provided with a pipe for introducing a continuous stream of acid such as hydrochloric or sulphuric, and in addition the nozzle is provided with means for simultaneously introducing a continuous stream of air whereby the material discharging into the vat is thoroughly aerated. The amount of acid should be such that acidulation, taking into account the character of the material being treated and its temperature, produces relatively complete precipitation of coagulable casein. Acidulation of the milk can vary over a substantial hydrogen ion concentration range of from pH 4 to 5.5, and should be at or near the isoelectric point of the casein for the temperature of the milk at the time of treatment. Depending upon the hydrogen ion concentration the temperature of treatment may vary over a range of from 40 to 200° F. As will be presently explained, in preparing a product having special characteristics making it desirable for human consumption, I prefer to employ a hydrogen ion concentration of the order of 5.5 with the milk at an elevated temperature of the order of from 150 to 200° F.

After a given quantity of the acidulated and aerated milk has thus been jetted into a vat or flotation tank, the foam, which has risen and is floating upon the whey, can be removed by suitable means such as a screen, scoop, shovel or a cloth hoop such as is used in removing curd from a Swiss cheese vat. Instead of physically removing the foam from the whey it is possible to drain away the whey from beneath the casein, after which the casein foam can be shoveled from the vat.

After the foam rises to the surface of the whey a considerable amount of whey which may be entrained with the foam, drains out by gravity. After removal from the vat the foam may be permitted to stand for further drainage of whey. If it is desired to effect further purification the casein is washed with fresh water as by applying the fresh water as a spray to a layer of foam supported on a cloth or fine screen. Thereafter the foam is again permitted to stand for a short time to permit drainage. Foam produced in this manner can be dried by conventional methods, and then ground.

The process described above can be made continuous by providing means for continually or continuously removing foam and whey from the vat. Subsequent washing, drying and grinding of the foam can likewise be made continuous.

Figures 1 to 6 inclusive show a desirable form of apparatus for carrying out the process continuously. This apparatus includes one or more special nozzles 10 for the discharge of an aerated jet or spray of milk into one end of the elongated flotation vessel 11. As will be presently explained the nozzle is provided with pipe connections 12, 13 and 14 for simultaneous introduction of acid, air and milk. For continuously urging the floating foam towards the discharge end of the vessel 11, mechanical means in the form of an endless belt 16 is provided, and this belt carries paddles 17 which sweep slowly over the surface of the whey to carry the foam towards the discharge end of the vessel (to the right end as viewed in Figure 1). At the discharge end of the flotation vessel there is a foam removing conveyer 18 which is inclined at such an angle that the foam is elevated and translated from the vessel 11, without slipping back into the whey. The belt forming this conveyer can be of perforated metal or cloth, whereby during transit there is opportunity for some drainage of whey to occur from the foam. Such drainage is caught and returned to vessel 11 by apron 19. After being elevated from the vessel 11 the foam is passed beneath a plurality of fresh water spray nozzles 21, where it is sprayed with fresh wash water. Water draining from the foam during and immediately subsequent to such washing is collected by pan 22.

After passing below the spray nozzles 21 the conveyer belt inverts for the return run of the conveyer, thus causing the foam to be discharged into the conveyer or apron 23, which delivers it to a suitable press 24 such as one of the roller type, after which the pressed material is delivered to the storage tank 26. Thereafter the material can be dried and ground. The removal and discharge of washed foam from the conveyer belt may be aided by the provision of air jets 27, a mechanical vibrator 28, or both.

A constant level is maintained in the flotation vessel 11 by suitable syphoning means. This means includes the lower drainage pipe 31, connected to a valve controlled discharge pipe 32, and a pipe 33 which extends upwardly to the level which it is desired to maintain, and there discharges into a collecting tank 34. A possible construction for this syphon pipe is shown in Figure 3. In this case the pipe 33 is formed in two parts 33a and 33b which are fitted together telescopically, so that the upper horizontal discharge spout 33c can be raised or lowered to thereby adjust the level of whey maintained in the vessel 11.

Figures 4 to 6 illustrate a suitable construction for the nozzle 10. Thus the pipes 13 and 14 which serve for introduction of air and milk respectively have T connections with pipes 36 and 37 which are telescopical, and which are sealed against leakage by packing gland 38. Pipe 36 also has a packing gland 39 through which the pipe 12 extends. These pipes are proportioned whereby passages are formed between them for flow of air and milk. Thus passage 41 is formed between pipes 36 and 37 for flow of milk, and a passage 42 is formed between pipes 36 and 12 for flow of air. At the tip end of the nozzle (Figure 5) passages 41 and 42 are restricted to form the annular discharge orifices 43 and 44, which closely surround the orifice 46 in the adjacent end of pipe 12. The liquids and the air discharging from the nozzle are therefore thoroughly intermingled with some atomization, and whereby when the resulting spray or jet discharges into the flotation vessel a considerable amount of undissolved air is distributed in the material to make possible the formation of foam cells or bubbles.

In conjunction with the nozzle just described it is desirable to provide a supplemental tube 47 which is Venturi shaped. The throat of tube 47 is larger in diameter than the discharging orifices, to accommodate for the expanding mixture leaving the tip of the nozzle. Tube 47 causes additional air to be drawn in through the opening 49 by aspirating action, whereby additional aeration or air entrapment occurs.

It is not essential to restrict the passages 41 and 42 as shown in Figure 5. Thus as shown in Figure 6 pipes 36 and 37 may be perfectly straight without end restrictions, whereby the milk and air is discharged directly from the passages 41 and 42. However the restrictions incorporated in the nozzle of Figure 5 are preferred.

To operate the apparatus described above, in carrying out the present process, the milk being employed, which as previously explained may be defatted dairy milk, is pumped at a constant rate through pipe 14 of the nozzle 10. Air is also delivered to pipe 13 at a substantially constant rate and pressure. The air may be from a suitable storage flask or from a compressor, and is passed through a suitable pressure reducing valve to maintain the pressure applied to pipe 13 substantially constant. The acid employed is fed continuously to the pipe 12 and the rate of flow can be controlled by a suitable valve. The milk and acid delivered can be adjusted for example to give a hydrogen ion concentration in the range of pH 4.4 to 4.8 for a temperature of the order of 90 to 100° F. The reducing air valve is set to deliver air at a pressure which will produce the desired amount of foam. Conditions giving the proper amount of foam can be tested quickly by selecting some of the material discharging from the nozzle, and determining the pH value of the whey, and noting whether or not a clear whey separates sharply from the foam. When these conditions have been reached for the temperature involved, the apparatus can be operated continuously over long periods of time without radical adjustments. After the aerated mass of milk is discharged into the flotation vessel 11 coagulated casein foam quickly rises to the surface and is propelled towards the discharge end of the vessel by the conveyer 16. There the foam is picked up and elevated by the conveyer 18, and after a period of drainage the foam is washed while under the spray nozzles 21. After wash water has drained away the foam is delivered to the press 24, and then finally dried and ground.

When it is desired to produce a product particularly adapted for human consumption, as for example for use in ice cream mixes, I have found that distinct characteristics making the casein product adaptable for this purpose can be obtained by carrying out precipitation at an elevated temperature and at a relatively high pH value. Particularly I can use temperatures of the order of from 150 to 200° F. with an amount of acid which will produce a hydrogen ion concentration in the neighborhood of about pH 5.5.

Suitable apparatus for carrying out the last described procedure is shown in Figure 7. The nozzle shown in Figure 7 consists of pipes 51, 52 and 53 which are telescoped and which terminate at a spray tip or nozzle 54. Space 58 between the pipes 52 and 53 receives air from the connecting pipe 59. Pipe 53 serves to introduce a suitable acid such as hydrochloric or sulfuric. At the tip 54, pipes 51 and 52 are restricted somewhat to form concentric annular orifices surrounding the discharge end of pipe 53. The material discharging from tip 54 is caused to pass through a tubular member 61 which is shaped in the form of a Venturi tube. In operation an aspirating action occurs as the material passes through the throat of the Venturi tube 61 to cause a considerable amount of air to be drawn continuously into the inlet 62 and to be intermixed with the liquid material. The divergent discharge end of tube 61 causes the jet of material to expand before its final discharge. As diagrammatically illustrated in Figure 7, milk is delivered to pipe 57 by the pump 66 and is heated to an elevated temperature by passing it through a suitable heater 67, such as one of the direct contact steam type. Pipe 59 is connected to a suitable source of air under pressure, which pressure may be adjusted by means such as the reducing regulator 68.

When operating at an elevated temperature and at a pH of about 5.5, the casein is precipitated from the hot milk in the form of very small particles which either enmesh with or form a part of the foam cells. Thus as in the first described process, the casein precipitate produced is a white and relatively fine grained product. At the lower temperatures and pH values, the precipitate tends to be somewhat doughy and sticky. However, at the higher temperatures and pH values of the order of 5.5, the precipitate formed is not sticky or doughy and consists of relatively hard granules.

It includes a substantial amount of the albumen present in the milk because the albumen is coagulated at the elevated temperature. This is advantageous where the product is to be used as a food for human consumption, because the protein yield of the process is increased. In addition the product produced at the higher temperatures and pH values is relatively high in calcium and phosphate content, which is attributed to the precipitation of calcium at the higher temperatures.

The above casein product produced at the higher temperatures and pH values can be readily resuspended in water either with or without small amounts of chemicals commonly used in the suspension of casein, as for example sodium hydroxide, or salts such as sodium carbonate, di-sodium phosphate or sodium citrate. Generally the use of sodium citrate or di-sodium phosphate is preferred. If the resuspended material is to be added to a milk product to produce for example an ice cream mix, enough di-sodium phosphate is added to produce a resulting material having a hydrogen ion concentration in the neighborhood of pH 6.4 to 6.7. Such a product is an opaque milky suspension of the casein with a bland flavor superior to the flavor of resuspended casein made by conventional methods. Also resuspensions of the present product do not have a bitter or soapy flavor such as is noticeable with resuspensions made from casein precipitated at lower temperatures and pH values. If desired resuspension of the casein can be facilitated by use of conventional homogenizing methods. This serves to give body to the products to which the present product may be added.

Without use of alkaline salts such as specified above, a resuspension in water of casein made at the higher temperatures and pH values specified, has a characteristic hydrogen ion concentrate of the order of pH 5.5 as distinguished from hydrogen ion concentrations of the order of pH 4.3 to 4.9 produced by resuspension of equivalent amounts of casein made by precipitation at lower temperatures and pH values. Suspensions of the product in water can be coagulated with rennet provided the calcium ion concentration is increased, as by introduction of small amounts of a calcium compound such as calcium chloride.

A simplified type of apparatus which can be used for carrying out my process is shown in Figure 8. In this instance a mixing device 71 can be employed in the form of a centrifugal pump. Pipe 72 connects the outlet of the pump with the discharge nozzle 73 which jets material into the vat 74. The runner or impeller 76 of the centrifugal pump can be similar to pumps of standard construction, except that it is desirable to employ one of reduced diameter in order to secure maximum agitation and intermixing within the pump housing. A short pipe section 77 is connected with the central inlet passage of the pump and is also connected with an open funnel 78. The milk to be treated, at a proper temperature, is introduced at a constant rate into funnel 78 thence through pipe 77. Another pipe 81 serves to introduce acid or other coagulant, and extends through the pipe section 77, to terminate at a point adjacent the pump impeller 76 as indicated.

When in operation the impeller 76 is driven at a sufficient speed to secure thorough intermixing and violent agitation within the pump housing. The milk to be treated is introduced into the funnel 78 and from the pipe 79, and simultaneously acid is introduced at a proper rate through pipe 81. Air is drawn into the pump housing through pipe 77, together with liquid, and within the pump housing acid is thoroughly intermixed with the milk, and simultaneously the milk is aerated to produce an aerated mixture which is jetted from the nozzle 73 into the vat 74. This vat can be equipped with the same mechanism for removing and washing the foam as described with reference to Figure 1, or if desired it may be the first of a series of vats 74a to 74e inclusive as shown in Figure 9. (See copending application 772,090, filed September 4, 1947.) The vats in this instance are arranged so that foam which is crowded from one vat, cascades into the next succeeding vat. All of the vats except the first can be provided with spray heads 75b to 75e inclusive for applying wash water to the foam.

In the foregoing I have made particular reference to use of air for intermixing with the acidulated milk to form the desired foam. It is to be understood that equivalent noncondensible inert gases can be used if desired, as for example nitrogen, carbon dioxide, or like gases which are non-condensible in that they do not condense at atmospheric pressures and at temperatures from about room temperatures to about the boiling point of water at atmospheric pressure, and which are inert in that they are not harmful and are not detrimentally reactive to the materials present. When carbon dioxide gas is used a reduced amount of acid is required to produce the degree of acidity required for coagulation.

In the foregoing particular reference has been made to the manufacture of casein products from defatted dairy milk. The process however is also applicable for the manufacture of coagulated protein products from synthetic milks or like aqueous materials made from substances such as soybean flour, peanut flour and cottonseed meal. Synthetic milks of this character made by suspending such materials in water, contain coagulable protein similar in many respects to the casein of dairy milk. For example coagulable protein products have been made from soybean milk at temperatures ranging from 80 to 200° F. and at hydrogen ion values ranging from pH 4 to 6.5 depending upon the temperatures employed.

An important feature of my process is that the milk or other liquid containing coagulable protein is thoroughly intermixed with the acid or other coagulant, simultaneously with dispersion of the noncondensible inert gas through these materials to form a foam containing the coagulated protein. It is this feature which makes possible relatively high yield of coagulated casein, and which enables production of casein in the form of a floatable foam, which is relatively tenacious and stable, and which can be readily washed with fresh water to produce a relatively pure product. For example with applicant's process it has been possible to produce 2.7 lbs. of dried casein per 100 lbs. of defatted dairy milk, to provide an over-all recovery of about 97% of the available casein. The curd in this instance was purified by washing with fresh water, with only a minor part of the casein being lost in the washing operation.

In one instance the curd after washing with fresh water had an ash content of 0.42% and the amount of casein lost in the washing operation was in the neighborhood of 0.078%. This demonstrates the ability of the foam produced by my process to be washed with fresh water, to produce a casein of high purity with a minimum amount of loss of casein during the washing operation.

This application is a continuation-in-part of my copending application Serial No. 612,965, filed August 27, 1945, now abandoned, and entitled "Casein Manufacturing Process and Apparatus."

I claim:

1. The method of recovering protein from aqueous liquid material containing protein in coagulable form, which comprises, simultaneously delivering into a mixing zone a stream of such aqueous liquid material, a stream of coagulant for said protein and a stream of noncondensible gas inert to the materials in said mixing zone, intimately mixing said liquid material with said coagulant in said mixing zone to form a mixture containing coagulated protein, and simultaneously dispersing said gas as a disperse phase into the liquid materials as a continuous phase in said mixing zone during the formation of said mixture to thereby produce a foam in which bubbles of said gas having walls containing substantially uniformly coagulated protein are dispersed in an aqueous liquid, and thereafter separating said foam from said last-mentioned aqueous liquid by difference in specific gravity between said foam and said last-mentioned aqueous liquid.

2. The method of recovering protein from aqueous liquid material containing protein in coagulable form, which comprises, simultaneously delivering into a mixing zone a stream of such aqueous liquid material, a stream of coagulant for said protein and a stream of noncondensible gas inert to the materials in said mixing zone, intimately mixing said liquid material with said coagulant in said mixing zone to form a mixture containing coagulated protein, and simultaneously dispersing said gas as a disperse phase into the liquid materials as a continuous phase in said mixing zone during the formation of said mixture to thereby produce a foam in which bubbles of said gas having walls containing substantially uniformly coagulate protein are dispersed in an aqueous liquid, thereafter separating said foam from said last-mentioned aqueous liquid by difference in specific gravity between said foam and said last-mentioned aqueous liquid, and washing said coagulated protein to purify the same.

3. The method of recovering protein from liquid lacteal milk, which comprises, simultaneously delivering into a mixing zone a stream of said milk, a stream of coagulant for casein and a stream of noncondensible gas inert to the materials in said mixing zone, intimately mixing said milk with said coagulant in said mixing zone to form a mixture containing coagulated casein, and simultaneously dispersing said gas as a disperse phase into the liquid material as a continuous phase in said mixing zone during the formation of said mixture to thereby produce a foam in which bubbles of gas having walls containing substantially uniformly coagulated casein are dispersed in whey, and thereafter separating said foam from said whey by difference in specific gravity between said foam and said whey.

4. The method of recovering protein from defatted liquid milk, which comprises, simultaneously delivering into a mixing zone a stream of said milk, a stream of coagulant for casein and a stream of noncondensible gas inert to the materials in said mixing zone, intimately mixing said milk with said coagulant in said mixing zone to form a mixture containing coagulated casein, and simultaneously dispersing said gas as a disperse phase into the liquid material as a continuous phase in said mixing zone during the formation of said mixture to thereby produce a foam in which bubbles of gas having walls containing substantially uniformly coagulated casein are dispersed in whey, thereafter separating said foam from said whey by difference in specific gravity between said foam and said whey, and washing said foam with water to purify the same.

5. The method of recovering protein from defatted liquid milk, which comprises, simultaneously delivering into a mixing zone a stream of said milk, a stream of coagulant for casein and a stream of noncondensible gas inert to the materials in said mixing zone, intimately mixing said milk with said coagulant in said mixing zone to form a mixture containing coagulated casein, and simultaneously dispersing said gas as a disperse phase into the liquid material as a continuous phase in said mixing zone during the formation of said mixture to thereby produce a foam in which bubbles of gas having walls containing substantially uniformly coagulated casein are dispersed in whey, thereafter separating said foam from said whey by difference in specific gravity between said foam and said whey, spraying wash water upon the casein foam to purify the same, and then drying the casein to form a dried casein product.

PAUL F. SHARP.

REFERENCES CITED

The following references are of record in the file of this patent:

UNITED STATES PATENTS

| Number | Name | Date |
| --- | --- | --- |
| 2,225,387 | Lowe et al. | Dec. 17, 1940 |
| 2,228,151 | Oberg | Jan. 7, 1941 |
| 2,368,919 | Fritzberg | Feb. 6, 1945 |